United States Patent [19]
Dalton

[11] 3,738,672
[45] June 12, 1973

[54] DOLLY FOR MOVING VEHICLES

[76] Inventor: Virgil D. Dalton, 2311 Burgener Boulevard, San Diego, Calif. 92110

[22] Filed: Sept. 20, 1971

[21] Appl. No.: 181,871

[52] U.S. Cl. .................................. 280/3, 280/255
[51] Int. Cl. ............................................ B60k 27/00
[58] Field of Search ...................... 280/3, 255, 253; 74/157

[56] References Cited
UNITED STATES PATENTS

| | | | |
|---|---|---|---|
| 3,269,740 | 8/1966 | Hutchinson | 280/3 |
| 260,840 | 7/1882 | Candler et al. | 280/255 |
| 3,549,161 | 12/1970 | Pusztay | 280/3 |

FOREIGN PATENTS OR APPLICATIONS

| | | | |
|---|---|---|---|
| 642,857 | 5/1928 | France | 280/255 |
| 643,218 | 4/1937 | Germany | 280/3 |

Primary Examiner—Leo Friaglia
Attorney—Gordon W. Daisley

[57] ABSTRACT

A dolly type device for manually moving house and boat trailers, aircraft and other vehicles has a single ground-engaging wheel mounted in a supporting frame adapted to be swively connected to the vehicle to be moved, the wheel and the supporting frame having mounted thereon elements of a pawl and ratchet type mechanism for driving the dolly either forwardly or rearwardly by means of a manually actuated jacking handle which also serves to steer the dolly. The driving mechanism also permits the dolly to freewheel in the selected direction of movement while preventing rollback, and can be so adjusted as to prevent movement in either direction.

12 Claims, 7 Drawing Figures

PATENTED JUN 12 1973 3,738,672

INVENTOR
VIRGIL D. DALTON

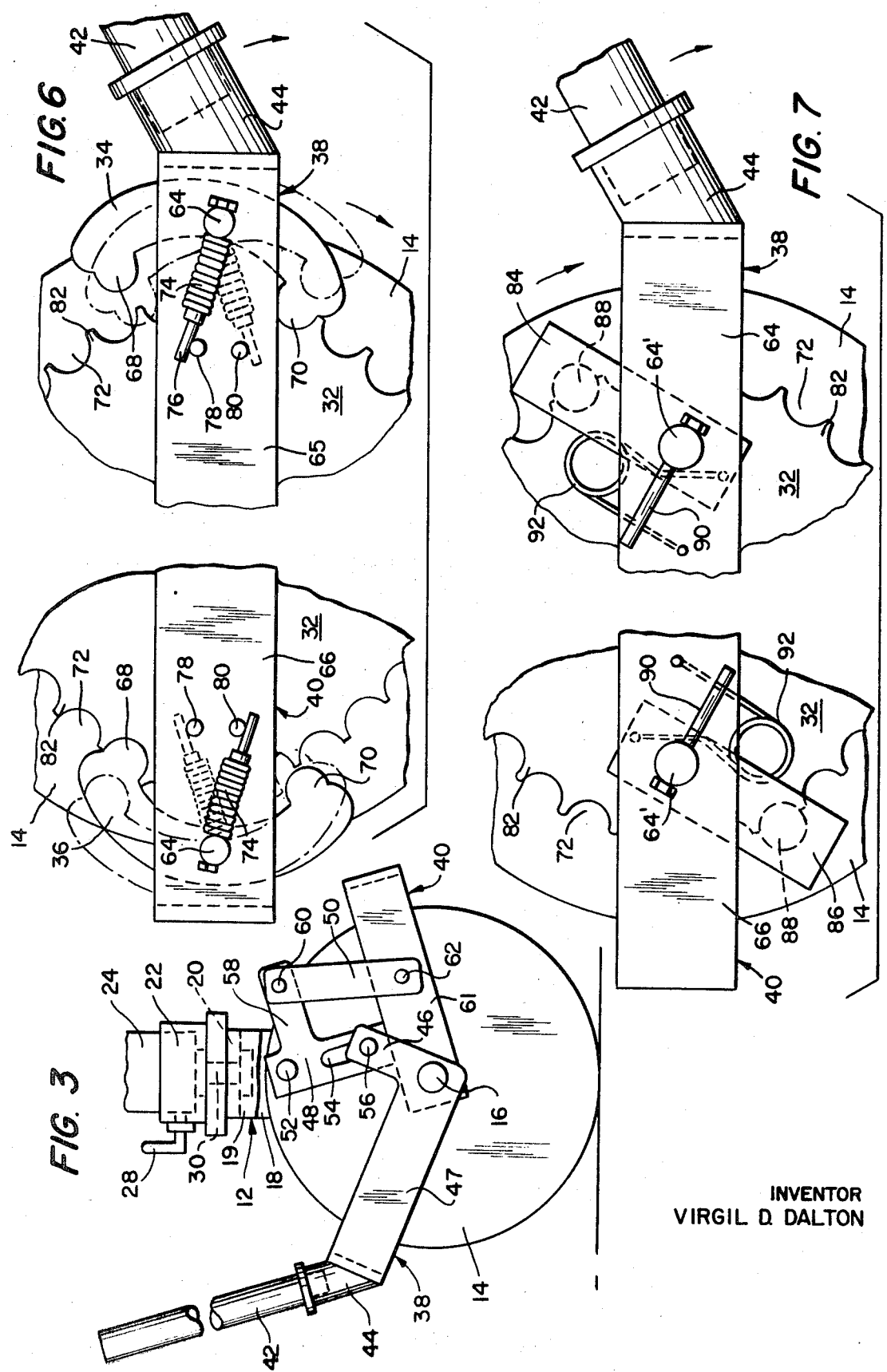

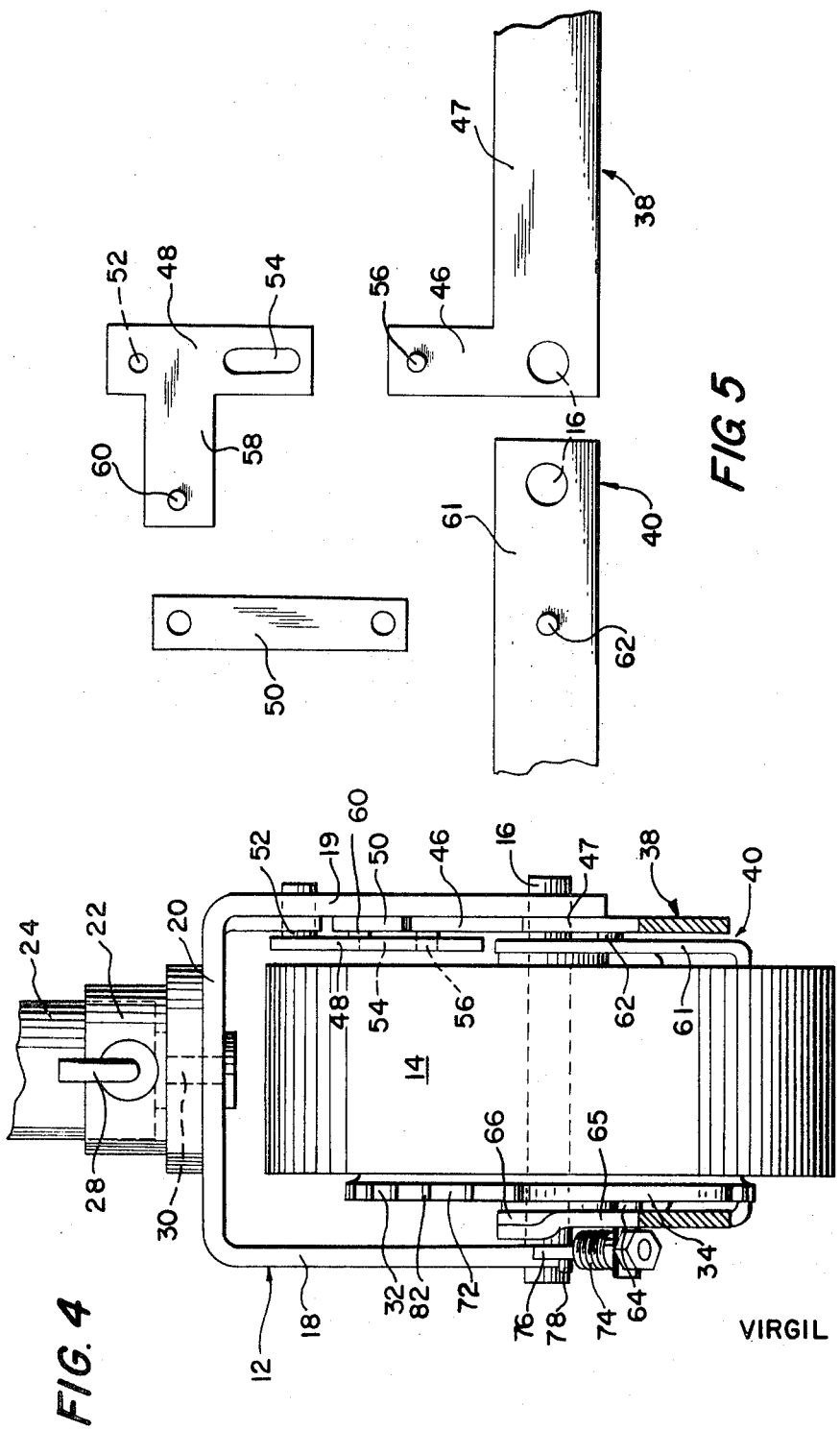

DOLLY FOR MOVING VEHICLES

This invention relates to devices for manually moving and maneuvering house and boat trailers, aircraft and other vehicles, and is more particularly directed to dolly type devices of improved construction whereby such vehicles may be easily moved from place to place, on inclines as well as level ground, by one person using only normal manual force.

Prior to the present invention, various manually actuated devices have been provided for moving trailer type vehicles, such as those disclosed in U.S. Pat. Nos. 2,786,690 and 3,269,740. However, these earlier devices are of relatively bulky, expensive construction, are difficult for one person to operate, particularly as respects directional control, and embody ground-engaging link belts or chain and gear driving mechanisms which are apt to become clogged with mud or dirt picked up from the ground. The primary objective of the present invention is to provide a dolly for moving trailers and similar vehicles which overcomes the disadvantages of the mechanisms heretofore available for this purpose, and which is of simple, compact and relatively inexpensive construction, easy to operate and maintain, and capable of moving and steering a load either forwardly or backwardly with a minimum of manual effort, and of positively preventing such movement when desired, as the load is parked on either level or uneven ground.

In general, the invention resides in a single-wheel dolly adapted to be swively connected to, for example, the towing frame of a house or boat trailer or the forward landing gear of an airplane, the wheel of the dolly carrying the driven member of a pawl and ratchet type driving mechanism, while the wheel supporting frame also supports front and rear pawl-carrying yoke members which are oscillatable in a vertical plane about the wheel axis by means of a manually actuated jacking handle which also serves to steer the dolly. The front and rear yoke members are interconnected by a linkage which either raises or lowers the rear yoke simultaneously with the front yoke, and the driving pawl members are pivotally mounted on the yokes and so constructed that each pawl may be individually adjusted so as to engage the driven member either above or below the associated yoke and thereby determine the direction of movement of the dolly, or, when both pawls engage the driven member above or below the yokes, lock the dolly against movement in either direction. Each pawl is provided with a biasing spring which allows the driven member to overrun the pawl when the other pawl is applying the driving force to the driven member.

Referring now to the drawings, wherein like reference characters indicate like parts throughout the several views:

FIGS. 2 and 3 are side elevational views of the dolly taken from the side opposite that shown in FIG. 1, and with part of the wheel supporting frame broken away so as to better illustrate the linkage interconnecting the front and rear yokes, FIG. 2 showing the yokes in their lowermost position and FIG. 3 showing them in their uppermost position;

FIG. 4 is an enlarged end elevational view of the dolly shown in FIGS. 1 and 2, taken from the right in FIG. 1, part of the front yoke being broken away in order to expose the front driving pawl;

FIG. 5 is an exploded side elevational view of the elements of the linkage shown in FIGS. 2 and 3;

Figure 1:
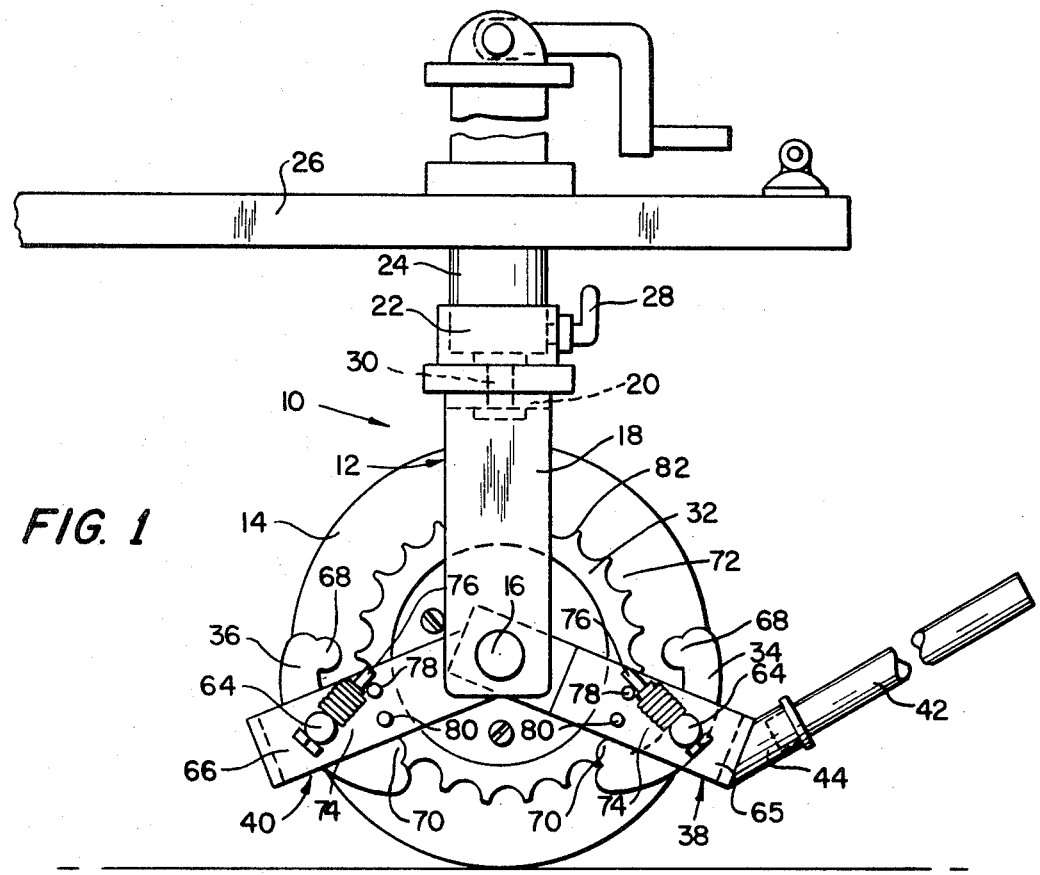
FIG. 1 is a side elevational view of one specific form of dolly embodying the invention indicating how the dolly may be connected to the towing frame of a house or boat trailer, and showing the driving pawl members in a wheel locking position.

FIG. 6 is a fragmentary enlarged side view of the structure illustrated in FIG. 1 showing the driving pawl members in the positions occupied when the dolly is to be driven forwardly, i.e., to the right as viewed in FIG. 1; and FIG. 7 is a fragmentary enlarged side view comparable to FIG. 6 showing a modified form of driving pawl mechanism with the pawl members so positioned as to drive the dolly forwardly.

In the embodiment of the invention illustrated in FIGS. 1–6, the dolly 10 comprises a fork type frame 12 which supports a single ground-engaging wheel 14 of any suitable type providing good traction, the wheel being mounted on a horizontal axle 16 carried by the lower ends of the legs 18, 19 of frame 12. Mounted on top of the horizontal head 20 of the frame is a socket member 22 which is adapted to receive a depending element 24 of a vehicle to be moved, such as the jack shaft usually carried by the towing frame 26 of a house or boat trailer. Socket member 22 is provided with a suitable locking screw 28 which prevents relative rotation between the socket and the element 24, but has a swivel connection 30 to the head 20 of frame 12 so that the frame and the wheel 14 are free to turn about a vertical axis relative to socket 22, element 24 and frame 26, and to thereby steer the vehicle being moved by the dolly.

In order to drive the wheel 14 either forwardly or rearwardly, a pawl and ratchet type mechanism is provided comprising a driven member in the form of a ratchet or sprocket wheel 32 which is concentric with and fixed to the wheel at one side thereof, and a pair of driving members or pawls 34 and 36 which are mounted on U-shaped yoke members 38 and 40 forwardly and rearwardly, respectively, of supporting frame 12. The yoke members 38 and 40 are mounted on the axle 16 for oscillatory movement in a vertical plane by means of a jacking handle 42 which is detachably connected to the front yoke 38 in any suitable manner, as by a threaded socket 44, and a linkage next to be described which so connects the front yoke 38 to the back yoke 40 that the latter moves upwardly and downwardly simultaneously with, and in the same direction as, the former.

Figure 2:
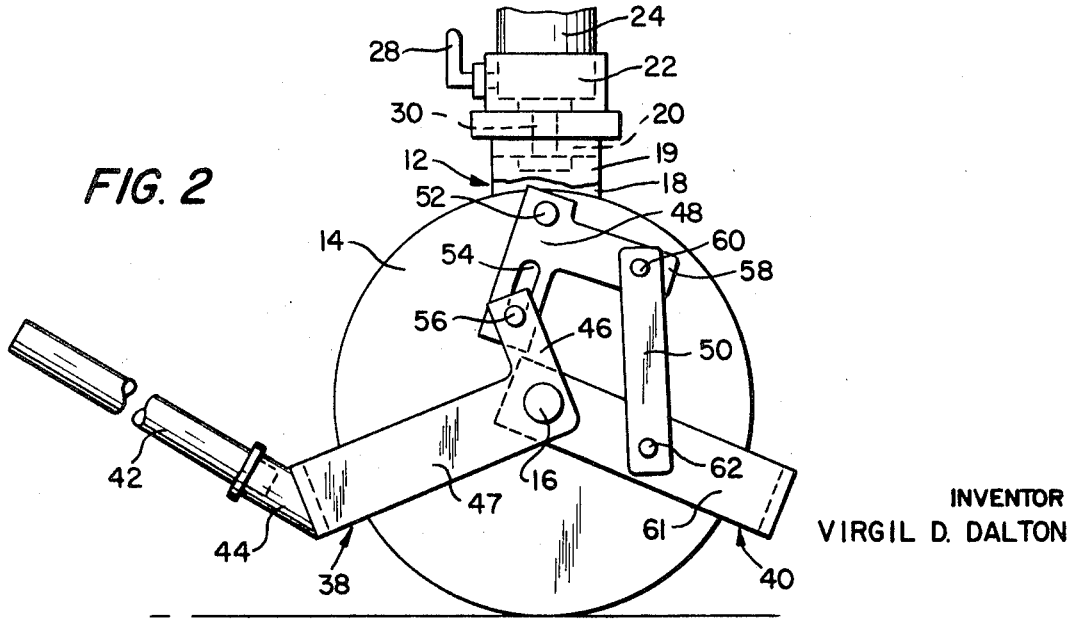

As shown in FIGS. 2–4, the linkage interconnecting front and back yokes 38 and 40 comprises a lever arm 46 fixed to and extending upwardly from the leg 47 of front yoke 38 at the side of the wheel 14 opposite sprocket member 32 adjacent the axle 16, a substantially L-shaped back yoke drive link 48, and a back yoke connector link 50. Drive link 48 is pivotally supported at its upper end on a pin 52 carried by the projecting horizontally inwardly from the right-hand (as viewed in FIG. 4) leg 19 of frame 12, and has an elongated slot 54 adjacent its other end which receives a pin 56 carried by lever arm 46 and extending horizontally towards the wheel. Drive link 48 is also provided with an arm 58 which extends laterally therefrom adjacent its pivotal axis, and which carries adjacent its free end a pin 60 extending horizontally away from the wheel. The leg 61 of rear yoke 40 on the side of the wheel opposite sprocket 32 is provided intermediate its ends with a pin 62 extending horizontally away from the wheel, the pin 62 forming a pivot for the lower end of connector link 50, the upper end of which is pivoted on the pin 60 carried by the arm 58 of drive link 48.

With the linkage as shown, upward movement of jack handle 42 and front yoke 38 from the position illustrated in FIG. 2 results in clockwise movement of lever arm 46 of the front yoke, causing pin 56 to bear against the right-hand side of slot 54 in drive link 48 and thereby rotating the drive link in a counterclockwsie direction about pivot pin 52. This movement of drive link 48 raises arm 58 and, through connector link 50, also raises back yoke 40. The front and back yokes thus move upwardly simultaneously. Upward movement of the two yokes is limited to the position illustrated in FIG. 3 by abutment of the bottom end of drive link 48 against the upper edge of leg 61 of back yoke 40. Downward movement of jack handle 42 and front yoke 38 from the position shown in FIG. 3 produces a simultaneous downward movement of back yoke 40, the pressure of pin 56 against the left-hand side of slot 54 rotating drive link 48 in a clockwise direction and thereby lowering back yoke 40 until pin 56 abuts the bottom end of slot 54 as shown in FIG. 2, thus limiting downward movement of the yokes. In each instance, pin 56 first rises in slot 54 until the pin moves into alignment with axle 16 and pivot pin 52, and then moves downwardly in the slot until it abuts the lower end of the latter. If desired, upward and downward movement of the yokes may be limited by providing frame 12 with suitable stop members so placed as to positively prevent movement of the yokes beyond predetermined positions.

In order to illustrate how the geometry of the linkage may be utilized to limit the arcs of oscillatory movement of the yokes, FIG. 5 is an exploded view of the elements of the linkage drawn to scale and represents a construction for use with an 8 inch diameter wheel having the following dimensions:

Distance between the axis of pivot pin 52 and the axis of axle 16 — 3⅝.

Distance between the axis of pivot pin 52 and the bottom end of drive link 48 — 2 9/16 inches.

Distance between the axis of pivot pin 52 and the bottom of slot 54 — 2⅜ inches.

Length of slot 54 — 1⅛ inches.

Distance between the axis of axle 16 and the axis of pin 62 — 2 inches.

Distance between the axis of axle 16 and the axis of pin 56 — 1 15/16 inches.

Distance between the axis of pin 60 and axis of pin 62 — 3 inches.

Distance between the axis of pin 60 and the center line of drive link 48 — 2 inches.

With these dimensions, the arcs of oscillatory movement of the front and back yokes are approximately 55° and 45°, respectively. With yokes of a length such as to clear the wheel tread by about one-half inch, when the yokes are in their lowermost positions they will remain well clear of the ground.

Referring now to FIGS. 1, 4 and 6, the means by which oscillatory movement of jack handle 42 and front and back yokes 38 and 40 is converted into forward or backward rotation of ground-engaging wheel 14 comprises the previously mentioned sprocket wheel 32 and the driving pawls 34 and 36. Each of the pawls is an arcuate shaped lever pivotally mounted at its midpoint on one of the yokes by means of a pin 64 which is fixed to the pawl and is journaled in the left-hand (as viewed in FIG. 4) leg of the associated yoke at a position outside the periphery of sprocket wheel 32. As shown, front pawl 34 is mounted on the leg 65 of yoke 38, while back pawl 36 is similarly mounted on the leg 66 of yoke 40. Each of the pawls is coplanar with sprocket wheel 32 (the axle engaging end of leg 65 being offset as shown in FIG. 4 so that the pawl carrying portion thereof is coplanar with leg 66) and is provided adjacent its ends with rounded protuberances or teeth 68 and 70 which are shaped to conform to the intertooth spaces 72 of the sprocket wheel. The shape of each pawl is such that only one of its teeth 68 and 70 can engage the sprocket wheel 32 at a time.

In order to selectively engage the pawl teeth with the sprocket wheel, each pawl has fixed to its pivot pin 64 outboard of the yoke leg 65 or 66 a tightly coiled helical spring 74 which extends inwardly relative to the periphery of wheel 14 toward the axle 16, each spring being provided at its free end with a manually grippable tip 76 by which the associated pawl may be turned about the axis of pin 64 so as to move one or the other of pawl teeth 68 and 70 into engagement with the sprocket wheel. In order to yieldably maintain each pawl in its selected position, each of yoke legs 65 and 66 is provided with a pair of positioning pins 78 and 80 which project outwardly from the yoke leg at positions on opposite sides of a line joining the axes of axle 16 and pawl pivot pin 64.

With the pawls positioned as indicated in full lines in FIG. 6, i.e., with tooth 70 of front pawl 34 and tooth 68 of back pawl 36 in engagement with sprocket wheel 32, movement of jacking handle 42 is either direction will rotate ground-engaging wheel 14 in a clockwise direction and cause the dolly to move forwardly, i.e., to the right as viewed in FIGS. 1 and 6. On downward movement of handle 42, which causes downward movement of both yokes 38 and 40, driving force is applied to wheel 14 through the engagement of tooth 70 of pawl 34 with sprocket wheel 32, while the sprocket wheel overruns back pawl 36, the spring 74 of the back pawl yielding to permit counterclockwise movement of the pawl as its tooth 68 slips over the teeth 82 of the sprocket wheel as the latter rotates clockwise. Upon upward movement of handle 42, driving force is applied through tooth 68 of back pawl 36 while front pawl 34 is overrun by the sprocket wheel. Under these conditions, the dolly will also freewheel or coast forwardly, but cannot roll backwardly because the engagement of tooth 70 of front pawl 34 and tooth 68 of back pawl 36 with the sprocket wheel prevents counterclockwise rotation of wheel 14. By reversing the positions of the pawls as indicated in broken lines in FIG. 6, oscillation of jacking handle 42 will cause counterclockwise rotation of wheel 14 and rearward movement of the dolly, and also permit it to roll freely in a rearward direction while being locked against forward movement. If the position of one only of the pawls is reversed from that shown in FIG. 6, for example, if the tip 76 of spring 74 of front pawl 34 is moved beneath positioning pin 80 instead of being above pin 78, the dolly will be locked against rolling or coasting in either direction.

In the modified embodiment of the invention illustrated in FIG. 7, the double-ended arcuate shaped pawls 34 and 36 of FIG. 6 are replaced by rectilinear front and back pawls 84 and 86 which carry their pivot pins 64' adjacent one end and sprocket-engaging cylindrical pins 88 adjacent the other end, the radii of pins 88 being substantially equal to those of the intertooth spaces 72 of sprocket wheel 32. Each of pawls 84 and 86 is provided with a positioning handle 90 fixed to the outboard end of pivot pin 64', and a biasing spring 92 having one end anchored to the end of the pawl adjacent pivot pin 64' and the other end anchored to the yoke leg 65 or 66 at a position between pivot pin 64' and axle 16. The springs 92 are so formed as to yieldably maintain sprocket engaging pins 88 in engagement with the sprocket wheel whether the pawl be positioned upwardly as shown at the right in FIG. 7 or downwardly as shown at the left of the figure. In this form of the invention, the pawl pivot pins 64' are located inside the periphery of sprocket wheel 32, instead of outside as shown in FIG. 6.

With the pawls 84 and 86 positioned as shown in FIG. 7, downward movement of jacking handle 42 will move the dolly forwardly, applying clockwise rotational force to sprocket wheel 32 through pin 88 of front pawl 84, while clockwise rotation of back pawl 86 against the tension of spring 92 permits its pin 88 to slip over the sprocket teeth 82. Upward movement of handle 42 also produces forward travel of the dolly as the pin 88 of back pawl 86 moves the sprocket wheel clockwise while the latter overruns the pin 88 of front pawl 84. As in the case of the embodiment of FIG. 6, reversing the illustrated positions of pawls 84 and 86 by means of handles 90 results in backward movement of the dolly upon oscillation of handle 42, while reversing the position of one only of the pawls will lock the dolly against movement in either direction. Also as in the case of FIG. 6, with one pawl up and the other down, the dolly of FIG. 7 will roll or freewheel in the desired direction of travel, but will not permit rollback.

It will be evident from the foregoing description that, with either embodiment of the invention illustrated, the operator may readily move the load to which the dolly is attached either forwardly or rearwardly by proper selection of the positions of the pawls, and may simultaneously steer the dolly with the handle 42 due to the swivel connection between the frame 12 and socket member 22. While the dolly is being operated in either direction, the mechanism may be locked for packing or an emergency stop by simply reversing the position of one pawl. In this connection, it will be understood that the dolly may be provided with any suitable means for remotely controlling movement of one of the pawls so as to facilitate an energency stop.

Although only two specific embodiments of the invention have been described and illustrated in the accompanying drawings, it will be obvious to those skilled in the art that various modifications may be made in the form, details of construction and arrangement of the parts of the dolly without departing from the inventive concept. For example, it will be evident that means other than the particular types of pawls disclosed, such as pinch rollers, may be used for converting movement of the yokes into rotational movement of the ground-engaging wheel, and that movement of the front yoke may be transmitted to the rear yoke by linkages other than that specifically illustrated, such as a linkage wherein the pin and slot connection between lever arm 46 and drive link 48 is replaced by a pair of intermeshing gear segments. It is also possible to locate the linkage interconnecting the yokes on the same side of the ground-engaging wheel as the sprocket and pawls, or to use two ground-engaging wheels with the linkage, sprocket and pawls positioned between them. Reference is therefore to be had to the appended claims for a definition of the limits of the invention.

What is claimed is:

1. A device for attachement to and manually moving a vehicle comprising a supporting frame, means for detachably connecting said frame to a vehicle to be moved for swivelling movement about a vertical axis, a ground-engaging wheel supported by said frame for rotation about a horizontal axis, means for manually driving said wheel in a forward or rearward direction as selected by the operator, said driving means including a driven member fixed to said wheel, a pair of yoke members mounted on said frame for oscillatory movement in a vertical plane about the horizontal axis of said wheel, one of said yoke members extending forwardly of the wheel and the other extending rearwardly thereof, a handle connected to and extending forwardly of the forward yoke member for moving said yoke member upwardly and downwardly about said horizontal axis and swivelling said supporting frame and wheel about said vertical axis, a linkage carried by said supporting frame and interconnecting said front and rear yoke members, said linkage being so constructed and arranged that said rear yoke member is moved upwardly and downwardly simultaneously with, and in the same direction as, said front yoke member, wheel driving members carried by said front and rear yoke members for engagement with said driven member, each of said driving members being individually adjustable so as to engage the driven member at a position either above or below the associated yoke member as selected by the operator, and yieldable means biasing each of said driving members toward its selected adjusted position whereby each driving member may be overrun by said driven member when the other driving member is applying driving force to said driven member.

2. A device as claimed in claim 1 wherein said linkage comprises an arm fixed to and extending upwardly from said front yoke member and carrying a horizontally extending pin, a drive link pivotally supported adjacent one end thereof on said frame and having an elongated slot adjacent its other end receiving said pin, said drive link also having an arm extending laterally therefrom adjacent its pivotal axis, and a connector link connecting the arm on said drive link and the rear yoke member.

3. A device as claimed in claim 1 wherein each of said driving members is pivotally mounted intermediate its ends on the associated yoke member and each of its ends is so formed as to engage said driven member, and wherein said yieldable biasing means comprises a pair of elongated coil springs each fixed at one end to one of said driving members at the pivotal axis thereof and having its other end in lateral engagement with one or the other of two positioning pins fixed to the associated yoke member on opposite sides of a line joining the pivotal axis of said driving member and the horizontal axis of said wheel, whereby said coil springs also serve as manually operable means for adjusting the positions of said driving members relative to said driven member.

4. A device as claimed in claim 1 wherein each of said driving members comprises an arm pivotally mounted on the associated yoke member and carrying a projection adapted to engage the driven member, and a lever fixed to said arm for manually moving said driving member from one of said positions to the other against the force of said yieldable biasing means.

5. A device for attachment to and manually moving a vehicle comprising a supporting frame, means for detachably connecting said frame to a vehicle to be moved for swivelling movement about a vertical axis, a ground-engaging wheel supported by said frame for rotation about a horizontal axis, means for manually driving said wheel in a forward or rearward direction as selected by the operator, said driving means including a driven member fixed to said wheel, a pair of substantially U-shaped yoke members mounted on said frame for oscillatory movement in a vertical plane about the horizontal axis of said wheel, one of said yoke members extending forwardly of the wheel and the other extending rearwardly thereof, the outer radius of each yoke member being greater than that of said wheel so that the wheel is surrounded by each yoke member, a handle connected to and extending forwardly of the forward yoke member for moving said yoke member upwardly and downwardly about said horizontal axis and swivelling said supporting frame and wheel about said vertical axis, a linkage carried by said supporting frame and interconnecting said front and rear yoke members, said linkage being so constructed and arranged that said rear yoke member is moved upwardly and downwardly simultaneously with, and in the same directions as, said front yoke member, wheel driving members carried by said front and rear yoke members for engagement with said driven member, each of said driving members being individually adjustable so as to engage the driven member at a position either above or below the associated yoke member as selected by the operator, and yieldable means biasing each of said driving members toward its selected adjusted position whereby each driving member may be overrun by said driven member when the other driving member is applying driving force to said driven member, the driven member being a sprocket wheel and said driving members being provided with projections so shaped as to engage the intertooth spaces of said sprocket wheel.

6. A device as claimed in claim 5 including means for limiting the upward and downward movements of said yoke members.

7. A device for attachment to and manually moving a vehicle comprising a fork-like supporting frame, means for detachably connecting said frame to a vehicle to be moved for swivelling movement about a vertical axis, a single ground-engaging wheel supported by said frame for rotation about a horizontal axis, means for manually driving said wheel in a forward or rearward direction as selected by the operator, said driving means including a driven sprocket wheel member fixed to one side of said wheel, a pair of substantially U-shaped yoke members mounted on said frame for oscillatory movement in a vertical plane about the axis of said wheel, one of said yoke members extending forwardly of the wheel and other extending rearwardly thereof, a jacking handle removably connected to and extending forwardly of the front yoke member for moving said yoke member upwardly and downwardly about said horizontal axis and swivelling said supporting frame and wheel about said vertical axis, a linkage carried by said supporting frame at the side of said wheel opposite said sprocket wheel member and interconnecting said front and rear yoke members, said linkage being so constructed and arranged that said rear yoke member is moved upwardly and downwardly simultaneously with, and in the same direction as, said front yoke member, wheel driving pawl members carried by said front and rear yoke members for engagement with said sprocket wheel member, each of said pawl members being individually adjustable so as to engage the sprocket wheel member at a position either above or below the associated yoke member as selected by the operator, and yieldable means biasing each of said pawl memers toward its selected position whereby each pawl member may be overrun by said sprocket wheel member when the other pawl member is applying driving force to said sprocket wheel member.

8. A device as claimed in claim 7 wherein said linkage comprises an arm fixed to and extending upwardly from said front yoke member adjacent the pivotal axis thereof and carrying a pin extending horizontally towards said wheel, a drive link pivotally supported adjacent one end thereof on said frame and having an elongated slot adjacent its other end receiving said pin, said drive link also having an arm extending laterally therefrom adjacent its pivotal axis and carrying a pin extending horizontally away from said wheel, a pin fixed to said rear yoke member extending horizontally away from said wheel, and a connector link connecting the pins on said drive link and said rear yoke member.

9. A device as claimed in claim 7 wherein each of said pawl members is an arcuate arm pivotally mounted intermediate its ends on the associated yoke member and carrying at each end a protuberance so formed as to engage the intertooth spaces of said sprocket wheel member, and wherein said yieldable biasing means comprises a pair of elongated coil springs each fixed at one end to one of said pawl members at the pivotal axis thereof and having its other end in lateral engagement with one or the other of two positioning pins fixed to the associated yoke member and projecting outwardly away from said wheel on opposite sides of a line joining the pivotal axis of said pawl member and the horizontal axis of said wheel, whereby said coil springs also serve as manually operable means for adjusting the positions of said pawl members relative to said sprocket wheel member.

10. A device as claimed in claim 7 wherein each of said pawl members comprises an arm pivotally mounted at one end thereof on the associated yoke member and carrying at its other end a laterally projecting pin adapted to engage the intertooth spaces of the sprocket wheel member, and a lever fixed to said arm for manually moving said pawl member from one of said positions to the other against the force of said yieldable biasing means.

11. A device as claimed in claim 7 including means for limiting the upward and downward movements of said yoke members.

12. A device as claimed in claim 8 wherein said elongated slot in said drive link is closed at both ends and so limits movement of the pin carried by the arm fixed to said front yoke member as to limit the movement of said yoke member.

* * * * *